United States Patent Office 3,507,104
Patented Apr. 21, 1970

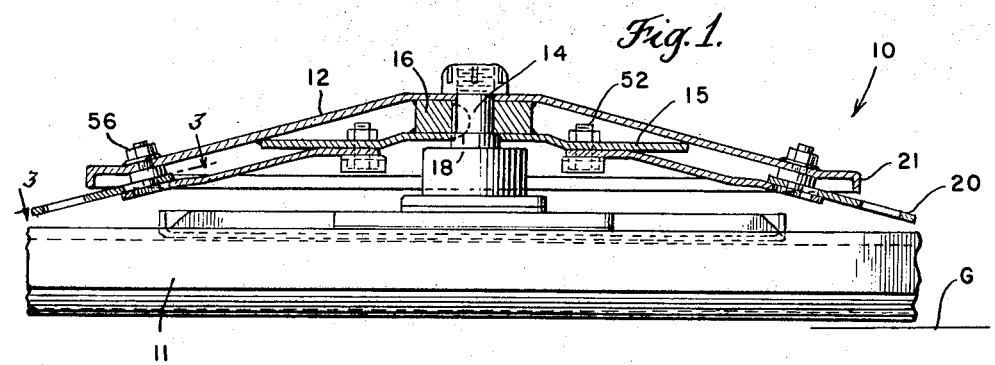
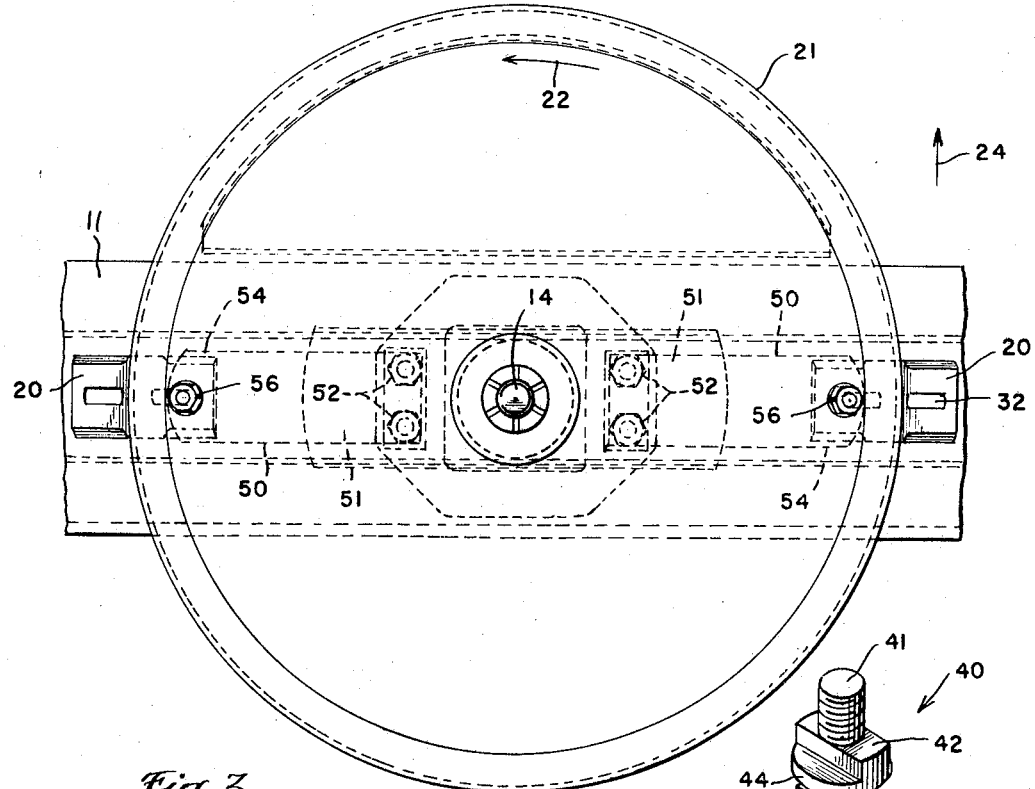
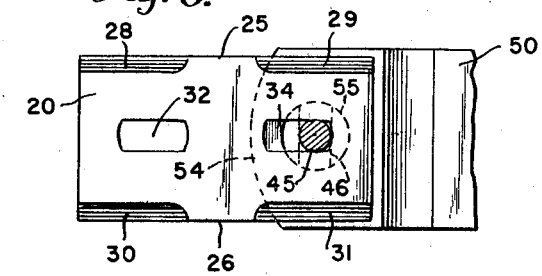
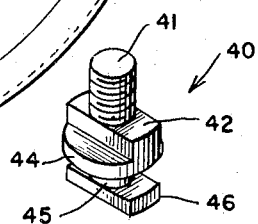
INVENTORS
CHARLES M. KLINE
& NEIL W. WEBSTER

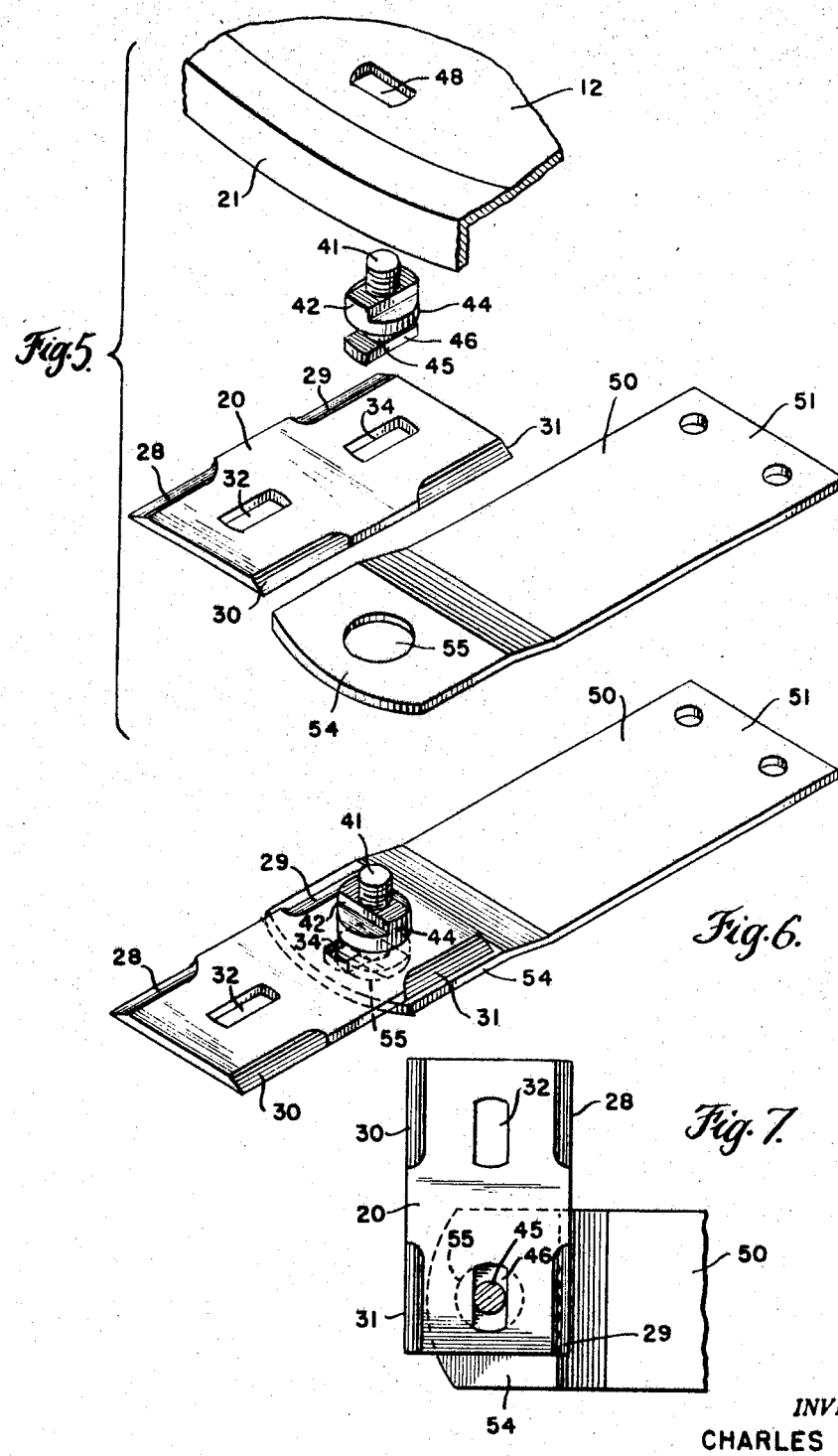

3,507,104
KNIFE MOUNTING
Charles M. Kline, Reinholds, and Neil W. Webster, New Holland, Pa., assignors to Sperry Rand Corporation, New Holland, Pa., a corporation of Delaware
Filed May 25, 1967, Ser. No. 641,277
Int. Cl. A01d 55/18
U.S. Cl. 56—295                                                   7 Claims

ABSTRACT OF THE DISCLOSURE

In a rotary mower, a generally conical-shaped disc support has a stud bolted to the underside with a cylindrical intermediate shank and a transverse elongated lower member, a rectangular-shaped flat plate-like knife with a pair of elongated radial slots, one of which fits over the elongated member in a circumferential position for pivotally mounting the knife on the shank and a leaf spring fastened at the inner end to the disc support adjacent the center thereof and having a circular opening at the other end fitting over the elongated member to hold the knife on the stud on movement to the circumferential position during operation.

BACKGROUND OF INVENTION

In recent years, mowers have been placed on the market having high speed elements which rotate about vertical axes. These rotatable elements comprise cylinders, discs or arms which carry radially projecting knives for cutting standing crop material. To operate effectively in dense tangled crops, the knives operate open and unobstructed and they are mounted to pivot freely on their supports if objects are engaged such as rocks and tree stumps. When a knife is damaged, it needs to be replaced and it is necessary that the knives be removable so that they can be sharpened. Since a mower of this type has a plural number of these cutting elements and a plural number of knives on each cutter, there are a substantial total number of knives and easy removal for replacement or repair is important.

DESCRIPTION OF THE INVENTION

A main obect of this invention is to provide an improved means for mounting a knife in a rotary type mower.

Another object of this invention is to provide a knife mounting in a rotary mower whereby the knife can be removed without the use of special tools.

Another object of this invention is to provide a knife mouting of the character described wherein a knife is mounted to pivot freely throughout a full circle on the structure which carries it whereby if an object is engaged in operation of the mower the knife is totally free to move away from it.

A further object of this invention is to provide a knife mounting of the character described wherein the normal operating position of the knife is easily obtained and removal of the knife for replacement and repair is simply accomplished.

A still further object of this invention is to provide a knife mounting arrangement which will achieve the foregoing objects with a structure which is relatively inexpensive.

Other objects of this invention will be apparent hereinafter from the specification and from the recital in the appended claims.

DESCRIPTION OF THE DRAWINGS

FIG. 1 is a vertical section through a portion of a rotary mower having means for mounting knives thereon constructed according to this invention;

FIG. 2 is a plan view of FIG. 1;

FIG. 3 is an enlarged section taken on the line 3—3 of FIG. 1 looking in the direction of the arrows and showing a knife, its mounting stud and its leaf spring holder;

FIG. 4 is a perspective view of the knife mounting stud;

FIG. 5 is an exploited isometric view showing a portion of the disc support, the knife, the mounting stud in its position to receive the knife, and the leaf spring which holds the knife on the stud;

FIG. 6 is a perspective assembly view showing the parts connected together; and

FIG. 7 is a plan view similar to FIG. 3 but showing the knife rotated ninety degrees so that it may be removed from the mounting stud.

PREFERRED EMBODIMENT OF THE INVENTION

Referring now to the drawings by numerals of reference, 10 denotes generally the cutter assembly of a rotary mower comprising a frame 11 which extends horizontally adjacent the ground G and carries a support 12 in the form of a disc rotatable about the vertically extending axis of a shaft 14. Disc support 12 is rotated at high speed such as three thousand r.p.m. by a drive structure, not shown, contained in frame 11. The support has a web element 15 and a spaced block 16 welded together and keyed at 18 to shaft 14.

As shown in FIG. 1, support 12 is dish shaped, with its concave side facing downwardly. Support 12 carries a pair of knives 20 at diametrically opposite locations on the support, FIGS. 1 and 2. The knives project radially outwardly of the periphery 21 of disc support 12. When the support 12 rotates counterclockwise as indicated by the arrow 22 in FIG. 2 the knives successively sweep forwardly of the frame 11 to cut standing crop material responsive to forward travel of the mower as indicated by the direction arrow 24.

Each knife 20 comprises a rectangularly shaped flat plate having parallel edges 25 and 26, each of which is provided with a pair of bevelled cutting edges, namely edges 28–29 and 30–31. Each knife also has a pair of slots 32 and 34 which are elongated in a radial direction relative to the axis of rotation of support 12. The sides of the slots are generally parallel to each other and the ends thereof are slightly curved, as shown. When mounted in place on support 12, the knives 20 have their bevelled edges 28–31 facing upwardly.

Each knife is connected to the disc support 12 by a stud 40 (FIG. 4) having a threaded upper end 41, a transversely elongated upper element 42, a cylindrical shoulder 44, a cylindrical intermediate shank 45 of reduced diameter relative to the shoulder and a transversely elongated lower member 46. Element 42 and member 46 are of the same size and they are in angular alignment with each other. Member 46 is of such size that it will snugly fit through opening 32 or 34 in the knife 20. Element 42 is of such size that it will fit through a matching elongated slot 48 (FIG. 5) in support 12.

The knife mounting assembly also includes a leaf spring 50 which is rectangular in shape and has an inner end 51 connected by bolts 52 to the support web 15. The leaf spring extends radially outwardly of the support 12 and at its outer end 54 it is provided with a round hole 55 of such diameter that it will suitably receive the lower member 46 of stud 40.

In connecting these parts together to provide a knife mounting, the parts are arranged as shown in FIG. 5. The opening 34 in blade 20 is passed over lower stud member 46. The knife assumes a position bearing against the underside of the shoulder 44. When a knife is in this position on the stud, the stud is turned ninety degrees, whereupon the knife is freely mounted between member 46 and shoulder 44 for pivotal movement on the periphery of the intermediate rouned shank 45. The upper element 42 is then projected upwardly through slot 48 in support 12 and a nut 56 (FIGS. 1 and 2) is applied to lock stud 40 to the support. When the leaf spring 50 is tightly bolted in place by the fasteners 52, the outer end 54 of the spring engages the flat bottom surface of knife 20 and biases it upwardly into engagement with shoulder 44. The lower stud element 46 projects through opening 55 in the leaf spring whereby the leaf spring is permitted free access to the bottom of the knife. The completed assembly is shown in FIG. 6.

With this structure, if a knife element engages an immovable object, it is free to pivot a full circle about the periphery of the rounded shank 45 of stud 40. When the knife becomes worn, or if it is to be replaced for some other reason, the operator merely has to pivot the knife to the position shown in FIG. 7 so that the slot 34 is in alignment with member 46. Using a screw driver, iron rod or any other type of lever, the outer free end 54 of leaf spring 50 is pried downwardly and the knife is then free merely to be dropped downwardly and off of the stud 40. It then can be turned around and remounted by projecting the slot 32 in the knife over the stud to reattach it to the support 12. The knife is then pivoted ninety degrees to its normal radial operating position and it is again detachably and yieldably held in place by the leaf spring 50. It will thus be seen that the knife is removable without the use of special tools, any item which can be used to provide leverage against the leaf spring 50 to pry it down will provide the means for removing and/or replacing a knife.

Leaf spring 50 also serves the function of assuring that knife 20 does not become detached from stud 40 when the knife rotates and member 40 comes into alignment with the knife slot. Thus, when an obstruction is encountered the knife will not fall off.

Conventionally, these cutter assemblies are provided in operating pairs on a support 11 with one disc rotating clockwise and the other counterclockwise relative to each other. In such an arrangement, the edges of the knives on one rotor which become worn are opposite to the knife edges on the adjacent assembly which becomes worn. In such cases, the two knives on one cutter can be removed and substituted for the two knives on the adjacent rotor and vice versa whereby all four cutting edges 28-31 can be used. This reduces the time that the mower has to be in the shop to resharpen knives and increases the time that the mower will be in the field.

The structure described is relatively simple and inexpensive. The stud 40 is always oriented in proper position relative to the support 12 by its interfitting with the transverse slot 48. Once the study has been fastened to support 12, the nut 56 never has to be removed except when the knife engaging surfaces of the stud become so worn that the stud itself has to be replaced. Otherwise, the knives can be removed and shifted around on the stud without disconnecting the stud from the support 12.

While this invention has been described in connection with a particular embodiment thereof, it will be understood that it is capable of modification, and this application is intended to cover any variations, uses or adaptations following, in general, the principles of the invention and including such departures from the present disclosure as come within known or customary practice in the art to which the invention pertains.

Having thus described our invention, what we claim is:

1. In a rotary mower, a rotatable and generally radially extending support, a stud mounted on said support and having an intermediate shank extending from said support and an elongated member spaced from said support by said shank, a knife having an elongated slot matching said elongated member and pivotally mounted on said stud to extend radially on rotation of said support and spring means having means fixing said spring means to said support and having means in overlapping relation with said stud and engaging said knife to yieldably press said knife toward said support and to yieldably move away from said overlapping relation to permit removal of said knife from said support.

2. In a rotary mower as recited in claim 1 wherein said elongated member on said stud extends transverse to a radial position of said knife and said slot extends longitudinally in said knife so as to be radial when said knife is in a radial position whereby said knife in the radial position is held on said support by said elongated member and in the transverse position is removable from said support by passing said slot over said elongated member.

3. In a rotary mower as recited in claim 2 wherein said knife is free to pivot in a full circle around said stud.

4. In a rotary mower as recited in claim 1 wherein said shank is cylindrical and has a diameter substantially the same as the width of said slot in said knife.

5. In a rotary mower as recited in claim 1 wherein said spring means is a leaf spring having an inner end attached to said support radially within said knife, and having an outer end engageable with said knife.

6. In a rotary mower as recited in claim 2 wherein said spring means comprises a leaf spring connected to said support and having an end engageable with said knife, said spring end having a hole through which said stud member passes for engaging said knife.

7. In a rotary mower as recited in claim 6 wherein said spring hole is circular and has a diameter great enough to receive the length of said elongated member of said stud.

References Cited

UNITED STATES PATENTS

| 3,418,793 | 12/1968 | Brewer | 56—295 |
| 3,318,793 | 12/1968 | Brewer | 56—295 |

FOREIGN PATENTS

| 246,599 | 11/1960 | Australia. |
| 846,853 | 8/1960 | Great Britain. |
| 246,599 | 11/1960 | Australia. |
| 6,603,479 | 9/1967 | Netherlands. |

ROBERT PESHOCK, Primary Examiner

J. A. OLIFF, Assistant Examiner